United States Patent [19]
Lewin et al.

[11] Patent Number: 5,271,492
[45] Date of Patent: Dec. 21, 1993

[54] CURVED RUBBER BELT CONVEYOR WITH DECENTRALIZED DRIVE

[75] Inventors: Heinz-Ulrich Lewin, Brinksitzerweg 14, 4600 Dortmund, Fed. Rep. of Germany; Jan Ketterer, Krefeld, Fed. Rep. of Germany

[73] Assignee: Heinz-Ulrich Lewin, Dortmund, Fed. Rep. of Germany

[21] Appl. No.: 832,305

[22] Filed: Feb. 7, 1992

[30] Foreign Application Priority Data

Feb. 8, 1991 [DE] Fed. Rep. of Germany ....... 4103772
Sep. 17, 1991 [DE] Fed. Rep. of Germany ....... 4130819
Dec. 20, 1991 [DE] Fed. Rep. of Germany ....... 4142486

[51] Int. Cl.⁵ .................................... B65G 15/08
[52] U.S. Cl. .................... 198/830; 198/835; 198/842
[58] Field of Search ................ 198/830, 835, 842

[56] References Cited

U.S. PATENT DOCUMENTS

| | | | |
|---|---|---|---|
| 2,759,595 | 8/1956 | Lauenstein | 198/830 |
| 3,094,206 | 6/1963 | Stewart et al. | 198/834 |
| 3,338,380 | 8/1967 | Grebe | 198/835 X |
| 3,533,499 | 10/1970 | Harkess | 198/835 |
| 4,024,949 | 5/1977 | Kleysteuber et al. | 198/835 X |

*Primary Examiner*—D. Glenn Dayoan
*Attorney, Agent, or Firm*—James Creighton Wray

[57] ABSTRACT

A conveyor belt for endless conveyor belt systems is laid in tight curve radii because the belt and the guide bar, which is attached to the underside of the belt, consist of highly elastic rubber. The belt is reinforced by preferably diagonally placed fabric inserts and can be pre-stretched in the longitudinal direction by means of a traction beam attached only at individual points so that it can do an optimum job in performing its transport function. The reversing rollers and the roller blocks are divided or are made up of individual units in order not to influence the guide bar, which runs in the middle, during the overrun. In this way, the necessary drive forces can attack at many corresponding places depending on the curve radius, without the conveyor as a whole, with a length of 100 meters and more, being subject to the so-called flip-arc effect. Instead, the curvilinear, decentrally powered conveyor belt is driven uniformly and is fed simultaneously, while one can achieve a high conveyor output also in the transfer area by means of corresponding troughing.

15 Claims, 7 Drawing Sheets

CURVED RUBBER BELT CONVEYOR WITH DECENTRALIZED DRIVE

BACKGROUND OF THE INVENTION

This invention relates to a conveyor belt, especially for use in below-ground mining and tunnel construction, that has decentralized drive units which are arranged in the carrying frame supporting the roller blocks in a manner distributed along the longitudinal extend, and a T-shaped guide bar provided on the underside of the belt, in which the drive rollers of the drive units engage bilaterally, said drive rollers being capable of being swung against each other via a clamping device, thus pushing the belt in a designated direction, as well as a belt revealing belt inserts.

Such rubber belt conveyors are used above all in below-ground mining and tunnel construction for bulk goods transport. The belt, consisting of rubber, is guided in roller blocks that are braced upon a carrying frame. From DE-OS [German Patent Application Laid Open to Inspection] 15 56 544 we know conveyors that reveal a guide bar on the underside of the rubber belt. This guide bar is engaged by guide rollers that are intended to make sure that the conveyor belt will run straight. Inserted into the guide bar are textile reinforcing inserts or coatings or also a through-going wire cable so that one can create a quite stable bar. The disadvantage here is that such a conveyor belt cannot be laid in a curve as a curve conveyor belt because the necessary drive and reversing rollers are still installed at both ends of the conveyor and those rollers would create the so-called rubber band or flip-arc effect if the conveyor belt were to be guided along a curve. DE-OS 32 29 061, in addition to the guides provided at an interval, also discloses the distributed arrangement of drives. These drives have drive rollers that engage the guide bar so that such a conveyor belt can be laid along a curve or in a curve. DE-OS 33 38 425 and DE-OS 37 41 054 show curve conveyor belts with a guide bar in the form of a molded rubber locking bolt, similar to a double T-beam which is glued on or on-vulcanized to the belt band cover with its upper lateral piece and in whose bar the friction wheels can engage. The lower flange is intended additionally to prevent the guide bar from being ripped out as the belt runs through troughs and saddles or to make this effect more difficult. Also in these known conveyor belts, the guide bar continues to be a problem because it is compressed again and again, especially when the conveyor belt is loaded, as it runs over the garland box. This kind of rolling effect also appears particularly at the turn-around points. Another disadvantage is represented by the fact that, depending on the curvature radius and the length of the belt, one can encounter problems as one runs along curves because either the pressing-on forces of the drive rollers are too great, so that we get the rolling effect also at the reversing rollers and at the roller blocks, or that the guide bar, in spite of its T-shaped design and the lower flange, can be pulled out of the guide, so that the belt then runs out of the anticipated guide. Finally, there is yet another disadvantage in that—in order to make the carrying frame and the individual subunit also in an articulated fashion—one must, at the connecting points, make a corresponding effort in the form of longitudinal holes, guides, and the like.

SUMMARY OF THE INVENTION

The purpose of the invention therefore is to create a curved belt conveyor which can be operated safely and reliably in short lengths and in lengths of more than 100 meters, with radii of 100 meters and less, both in the loaded and unloaded states.

This problem is solved according to the invention in that the belt and the guide bar, grasped by mutually clamped drive rollers, consist of elastic, preferably highly elastic rubber, that the roller blocks carrying the belt have a middle roller with a recess, and that the reversing rollers reveal a recess corresponding to the middle rollers.

The high degree of elasticity of the belt makes it possible to run through curves with larger and smaller diameters, without the belt having to be adjusted for that purpose. Accurate and reliable guidance is ensured here because the elastic conveyor belt and the correspondingly designed guide bar can be controlled and driven uniformly, while there cannot be any roll-around effects at the roller blocks and at the turn-around points. Instead, the belt is uniformly supported over the entire length, without any stress on the guide bar. Because one can now also work with a uniformly supported conveyor belt in the area of the turn-around points, the actual transfer will be uniform and reliable. One can even run a troughed reversing roller in order thus to keep the transfer stream of the bulk material together and to pass it on to the subjacent or adjacent conveyor belt.

According to a practical design of the invention, it is provided that the clamping device that influences the drive rollers be made so that it can be arrested, preferably by locking bolts that limit the swing range. In this way one can make sure that the two drive rollers each time can be pressed uniformly and only up to a certain predetermined measure against the side walls of the guide bar so that here again one can specifically prevent any negative roll-around action. Another advantage here is that the clamping action can in each case be maintained accurately, while the clamping device can be so designed that, in case of any wear and tear, it will automatically reclamp itself or that it can be reclamped mechanically without any major effort.

Another practical feature provides that the middle roller is to consist of two partial rollers arranged at an interval to each other, said interval being dimensioned in accordance with the foot of the guide bar. Such a design is advantageous and simple and the two partial rollers can be positioned easily and safely so that there cannot be any damage to or impairment of the guide bar. Here it is also conceivable that the individual partial rollers be designed in such a manner that they will at least guide or push back the counter-running guide bar. An advantage connected with this design is represented by the fact that one can fall back on the same diameters for the partial rollers so that there cannot be any unbalanced mass or the like, as a result of which one can ensure the uniform bracing of the conveyor belt over the entire length.

To make the guidance of the conveyor belt uniform, it is practical according to the invention if, in the undertrunk, guide units are provided that grasp the superposed guide bar and these guide units are arranged at double or greater interval than the drive rollers in the upper trunk. Because the conveyor belt is guided in a specifically oriented fashion also in the area of the undertrunk, it is possible to run through sections with tighter curve radii.

To ensure reliable sustained operation, it is practical according to the invention to allow the interval between the drive rollers and also the guide units to grow along with the curve radius of the belt system. Conversely, the tighter the curve radius, the closer the interval of the drive rollers and the guide units must be in order to ensure safe operation in this fashion. For example, in the case of a conveyor belt, laid with a radius of 100 meters, we use a total of 10 drive units that are arranged roughly every 17 meters. It is also conceivable to vary the interval of the drive units, looking from the middle of the curve, in order thus to achieve the uniform guidance of the belt. The dimensions of the guide bar, preferably its thickness, should increase with the capacity or width of the belt system because one can then ensure the introduction of the necessary forces. This increasing strength of the guide bar is more advantageous than if it were to be provided with a corresponding insert because the previously described negative flip-arc effect might after all recur quite easily.

Earlier we already pointed out that the reversing rollers are also best made in a divided fashion in order to guide the guide bar around the turn-around point without any stress on the bar. This is possible in particular if the reversing rollers and/or the middle rollers of the other roller blocks reveal several carrying disks positioned on a shaft, said disks being rotatable independently of each other, leaving in the middle an interval adapted to the guide bar, and being made with a diameter that is dimensioned larger as we go from the belt center to the outer edges. In terms of dropping conveyor material, this design also offers the advantage that we get a uniform troughing over the entire length so that such conveyor belts can be heavily loaded and, at the transfer point, they then pass the conveyor stream uniformly on to the next conveyor belt or to other conveyor equipment or a bin.

To keep the overall system as similar as possible, to get along with less drive energy, and to avoid any disadvantages resulting from excessive heat, etc., the invention provides that the carrying disks reveal perforations and that, in the perforations, there are preferably scoops that ensure ventilation and cooling. With the help of these perforations and the scoops arranged in them, the air can be guided in a specifically aimed fashion through the entire reversing roller or middle roller so that there cannot be any problems resulting from heating in the first place.

To increase the output at the individual drive stations, without generating the disadvantageous roll-around effect, the invention provides that several friction wheels, arranged behind each other in the direction of conveyance, together form one drive roller unit that is connected via a torque transmission system with a motor and that is adjustably positioned so that it can be moved in the direction of the guide bar. In this way, one can generate a considerably increased power output and the latter can certainly also be transmitted while, advantageously, no additional motors or drives are needed for this purpose. Instead, the plurality of friction wheels used per motor results in a correspondingly better drive transmission output. The way in which each friction wheel is pressed against the guide bar is identical to the press-on pressure of the neighboring friction wheels and can at the same time be regulated with them. As a result of the joint positioning of the friction wheels and their mobility in the direction of the guide bar, it is now possible to lift the particular drive unit off the guide bar in case any individual friction wheels should be blocked, in order thus to avoid any undesirable and harmful heating of the material.

The lifting off of the belt while running through troughs and saddles is ensured by the special design of the lower flange of the uide bar whereby this effect can be specifically optimized in that the lower flange of the guide bar, laterally with respect to the longitudinal axis of the guide bar, reveals stiffening members, by sections, in the form of bolts, pins, or plates.

These plates do not impair the conveying properties of the conveyor belt but they do supply the necessary stiffening and stabilization so that, even under the most unfavorable circumstances, it is impossible for the guide bar to be ripped out of the two drive rollers. The guide bar and thus also the entire belt are extensively flexible because of the use of corresponding material and the association of inserts and it is nevertheless sufficiently stable so that, in case of a high degree of stiffness in the longitudinal direction, there will still be sufficient flexibility available in the curves. In order to achieve this high degree of flexibility also in the case of the carrying frames, the invention provides that the subunits of the carrying frame reveal beams that run together pointedly at the ends and that they are arranged so as to form a cardan joint. Via this cardan joint, the individual subunits can then be advantageously swung against each other in all planes and directions without any need for changing anything in the connecting elements in the case of any alteration of the curve layout.

Especially when belts made of highly elastic rubber are used, it is advantageous if the belt is provided with a fabric insert that permits a stretch of 10 to 50%, preferably 15 to 40%, and if there is a high-strength traction beam that preferably runs in the middle of the belt, that exceeds the length of the load-relieved belt, and that is connected with the belt only at certain points. On the basis of the cleverly designed and arranged reinforcement, as well as the high-strength traction beam, we now have a belt that can also be guided through narrow curves with minimum curve radius, without any danger that either the outside will flip over or be overextended and rip or that the inside will fold. The belt carries the material to be conveyed without any problems because—due to the pre-stretch and the then tight position of the highstrength traction beam—there is the possibility of perfect transmission of the forces without influencing the actual belt itself. Here it is advantageous if the belt is equipped with lateral stiffening members in the form of in-vulcanized inserts or on-vulcanized lateral ribs in order thus to ensure a generally high degree of stability without avoiding flexibility in the curves. In the case of heavy stresses, one must prevent the conveyor belt, in a supplementary fashion, from being snatched out of the drive unit, so that the outer edge of the belt, on the outside of the curve, has supporting surfaces, preferably in the form of a club-like extension, and that the carrying frame in the area of the curve and in the adjacent areas reveals jibs arranged at an interval and equipped with catch rollers that can be pressed against the supporting surfaces. With this design, one can specifically retain the conveyor belt that tends to move to the outside without any overstressing of the belt or without the belt flipping over because the belt after all is traction-stressed from the inside by the corresponding device.

The invention is distinguished especially by the fact that it constitutes a conveyor belt whose outstanding feature is a high degree of elasticity which is so great that the belt, during its assembly, can be elastically pre-stretched by the necessary measure. The belt moreover has a guide bar that facilitates a decentralized drive technique by means of friction wheel. The belt is uniformly elastic over its entire width and height while the guide bar preferably consisting of the same material is firmly connected with it or even represents one structural unit. The belt has a reinforcement which, on the one hand, does not prevent the required elasticity of the belt and, on the other hand, generates a certain lateral stiffness of the belt that increases the notching resistance and that forms the abutment necessary for the connecting clamps. By virtue of the traction-proof traction beam, laid in the middle, the belt is in a position, after elastic pre-stretch of the belt, to present a rubber band that will precisely meet the requirements of the specific cases of use and that can be adapted to the particular practical application cases also in certain areas. Another advantage is represented by the possibility of running through curve radii of less than 100 meters by means of specifically controlled and accurate guidance, whereby the subclaims even present features that facilitate curve radii of less than 50 meters. Because of the material chosen, because of the stiffening members of its underflange, and because of the careful guidance also in the area of the roller blocks and the reversing rollers, the guide bar is excellently suited for transmitting the necessary drive forces without the development of any overload.

Further details and advantages of the object of the invention will emerge from the subsequent description of the pertinent drawing illustrating a preferred practical example with the necessary details and individual parts. To wit:

DETAILED DESCRIPTION OF THE DRAWINGS

Figures 1, 2:
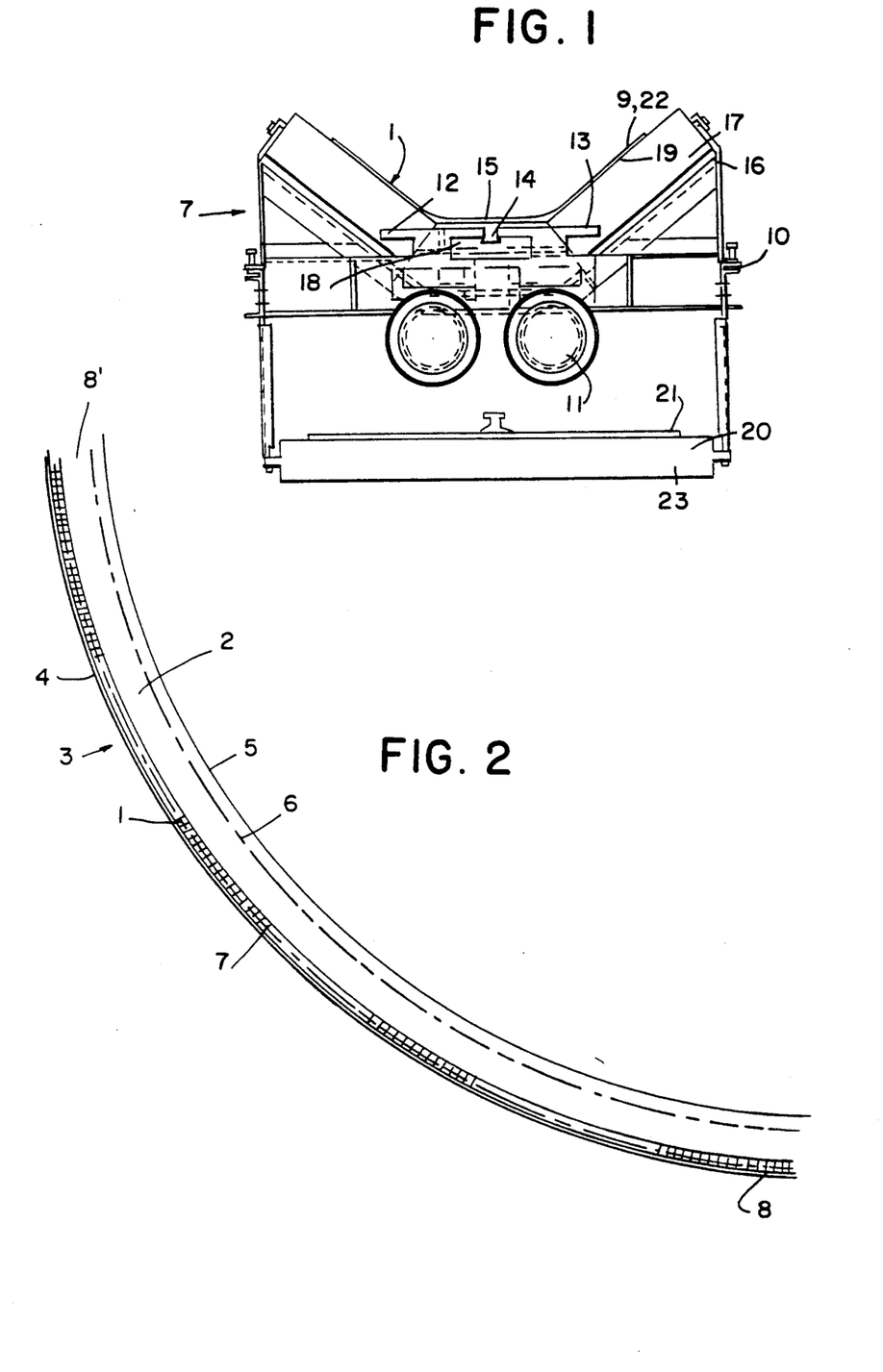
FIG. 1 shows a conveyor belt, in a profile, with decentralized drive.
FIG. 2 shows a conveyor belt laid along a curve.

FIG. 1 shows a lateral profile of a conveyor belt (1) where this conveyor belt (1) is laid in a segment (2) that is shown in the top view in FIG. 2. The special aspect of this conveyor belt (1) is represented by the fact that it is laid in the curve area (3) of the line segment (2), ensuring perfect conveyance of the conveyor material that is not illustrated here.

Figure 3:
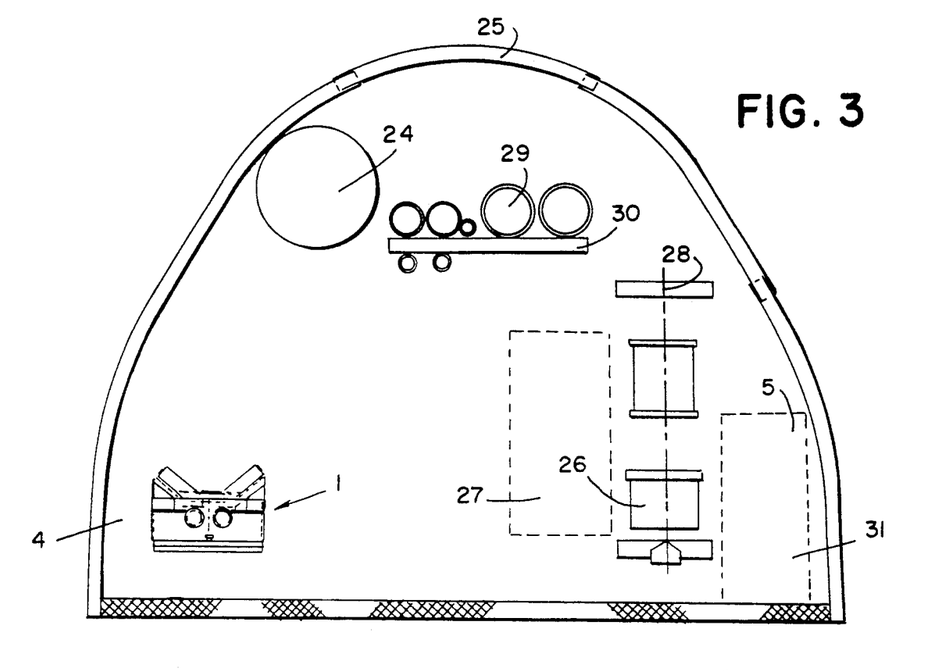
FIG. 3 shows a profile through the segment illustrated in FIG. 2.

While conveyor belt (1) is laid in the outside of the curve (4) of the line segment (2), a single-rail suspension rail system (6) is laid on the inside of the curve (2). Both the single-rail suspension rail system (6) and the belt system (7) reveal roughly the same space requirement as illustrated in FIG. 3.

In the adjacent areas (8, 8'), the conveyor belt (8) can then be laid straight so that the requirements are then considerably less.

FIG. 1 shows belt (9) that is guided in carrying frame (10). Here we first of all have the drive units (11)—arranged at an interval—with their drive rollers (12 and 13) that engage guide bar (14) on the underside of belt (9). Guide bar (14) and the entire belt (9) consist of highly elastic rubber (15).

Figure 4:
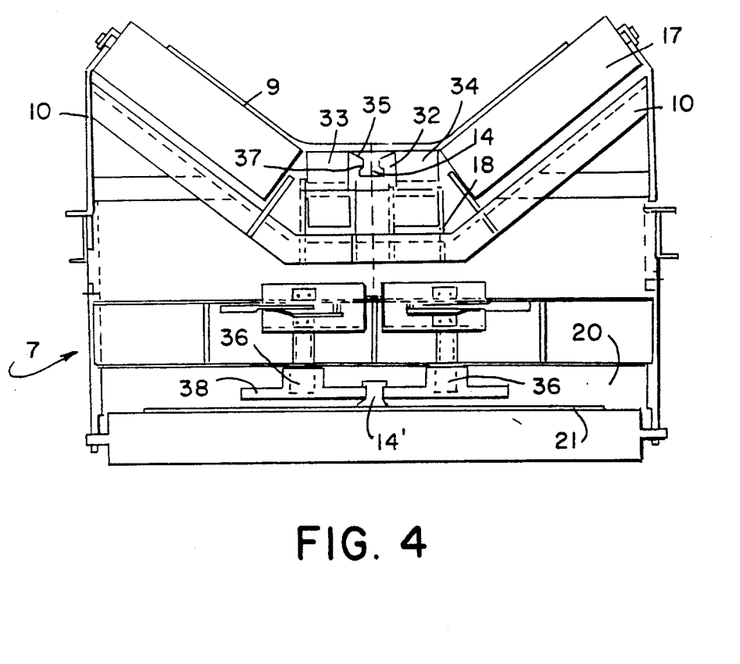
FIG. 4 shows a roller block with divided middle roller and undertrunk guide roller units.

In order to trough belt (9) and thus to enable it to accept larger quantities of material to be conveyed, we have provided the roller block (16) as shown in FIG. 1 and also in FIG. 4. These roller blocks (16) here consist of two lateral rollers (17) and middle roller (18), with these roller blocks (16) forming the overtrunk (19). Rollers (23) are also arranged in the undertrunk (20) to guide the underbelt (21). While the overbelt (22) is troughed accordingly, the underbelt (21) can be guided in a level manner.

FIG. 3 shows, as mentioned earlier, a lateral profile through a line segment (2), where we can see clearly that conveyor belt (1) is laid along the lateral face, specifically along the outside of curve (4), while the track (31) and the single-rail suspended rail system (6) are installed along the inside of curve (5). In the area of the ridges, air duct (24) and pipelines (29) or their suspension bars (30) are affixed to cribbing arch (25). The single-rail suspension container (26) is handled from the main operating room (27) and can be run along the single-rail (28) in the longitudinal direction of the latter.

FIG. 4 essentially corresponds to FIG. 1; the only difference is that in this case the middle roller (18) is shown clearly; in the middle, it has a recess (32) because it consists of two partial rollers (33, 34). These partial rollers (33, 34) leave an interval that roughly corresponds to the width of the foot (35) of guide bar (14).

This guide bar (14) is additionally guided by a guide unit (36) in the area of the underbelt (21). This guide unit does not have any drives; instead it moves only via guide rollers that turn along with the movement (38). The number (37) refers to the guide surface against which both drive rollers (12, 13) and guide rollers (38) are braced or against which they come to rest.

Figure 5:
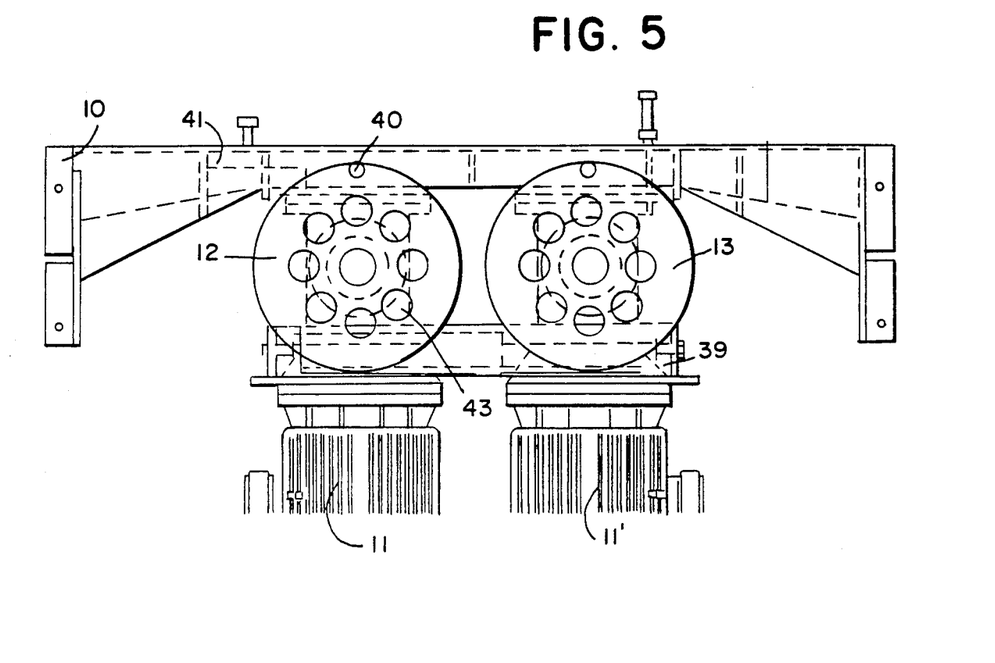
FIG. 5 shows a drive unit in a top view with swing limitation.
Figure 6:
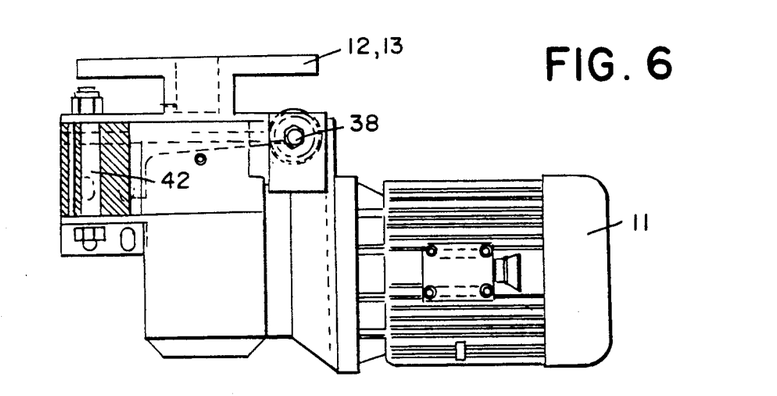
FIG. 6 shows a side view of a drive according to FIG. 5.

Drive units (11) are shown in FIGS. 5 and 6. Here we first of all note that the drive rollers (12, 13) are provided with large bore holes (43) that are designed to help reduce the weight of these drive rollers (12, 13). The unit consisting of the two drive rollers (12, 13) is pulled together via the clamping device (39); this is possible because said device is positioned in order to swing in each case around one swing point (40) exactly in the middle in front of them on carrying frame (10).

To prevent excessive influence on the guide bar which is extended between the two drive rollers (12, 13), we have provided locking bolts (41) that restrict the swing path of the drive units (11, 11').

FIG. 6 shows a side view of FIG. 5; here we can see both the arrangement of the clamping device (39) and of the swing point (40) or the screw (42) that is used for this purpose. Each of these two units can be swung around each of these screws (42) or from one corresponding swing point (40) to the other.

Figure 7:
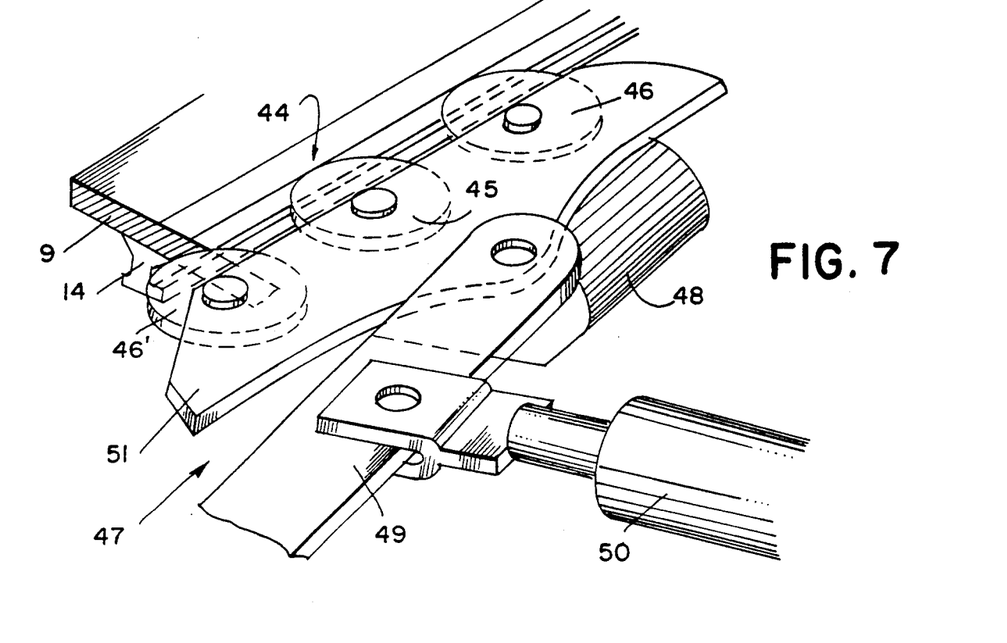
FIG. 7 shows a perspective view of a drive unit.

FIG. 7 shows a drive roller unit (44) that reveals a total of three friction wheels (45, 46, 46'). Friction wheels (45, 46, 46') are matched up with a common cross-head (51) in which they are positioned rotatably. Cross-head (51) again is swingably connected with a swing (49) that is held over a working cylinder (50) and that is connected with the carrying frame, not shown here.

Figure 8:
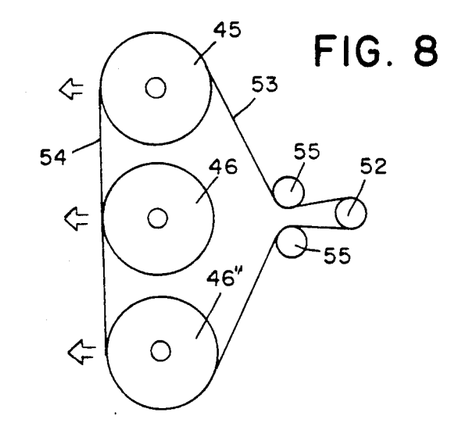
FIG. 8 shows a top view of a torque transmission system.

Via working cylinder (50) and swing (49), the drive roller unit (44) is uniformly pressed against guide bar (14), in which connection one can make sure that the same drive force or press-on force can be transmitted by all three friction wheels (45, 46). The individual friction wheels (45, 46) are driven according to FIG. 8 by a single motor (48) that is connected with them via a torque transmission system (47). Friction wheels (45, 46) here are used as pressure wheels that press the common toothed belt (53) with its side (54) against guide bar (14). We thus get an advantageously large surface for the transmission of the drive forces. We can achieve uniform guidance of the tooth belt (53) and as favorable as possible a wrap around angle by arranging pressure rollers (55) in the area of the motor and gear outlet (52).

Figure 9:
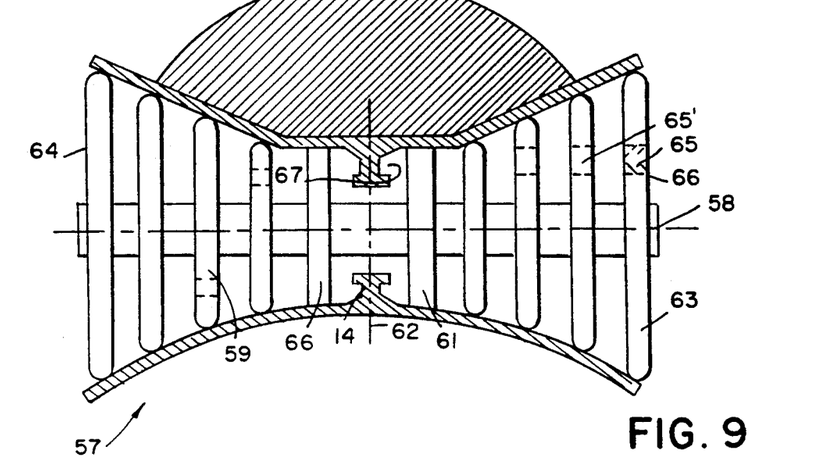
FIG. 9 shows a longitudinal profile of a reversing roller.

FIG. 9 shows a reversing roller (57), cut longitudinally, clearly indicating that it consists of several individual carrying disks (59, 60, 61) that sit on a common shaft (58). These carrying disks (59, 60, 61) reveal a diameter that becomes smaller toward the belt center (62) or a diameter that becomes larger toward the outer edges (63, 64). The outer edges of the individual carrying disks (59, 60, 61) are rounded off to prevent any damage to the belt (9).

Such reversing rollers (57) supply not only the necessary recess for the guide bar (14) but they also facilitate an advantageous troughing of the belt (9) in the area of the reversing rollers (57), which in turn facilitates a considerably better guidance and uniform transfer of the bulk materials.

Figure 10:
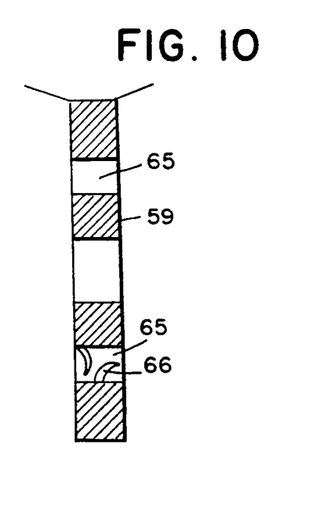
FIG. 10 shows a profile of a carrying disk according to FIG. 9.

The individual carrying disks (59, 60, 61) are equipped with perforations (65) in order, first of all, to facilitate cleaning work with the help of compressed air or water or so that the cleaning job can also be done more easily by mechanical means and, in addition, to achieve a ventilation effect in the area of the reversing roller (57). In a supplementary manner, scoops (66) are provided in the perforations (65) and the location of these scoops can also be seen in FIG. 10. Recesses (67) between the individual carrying disks (59, 60, 61) are regular, that is to say, their intervals are made uniform, while a correspondingly enlarged recess (67) is left only in the middle for the guide bar.

Figure 11:
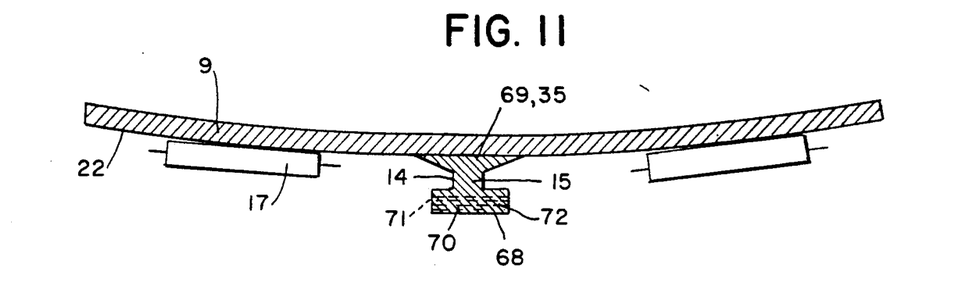
FIG. 11 shows a conveyor belt in a lateral profile with correspondingly cut guide bar.
Figures 12, 13:
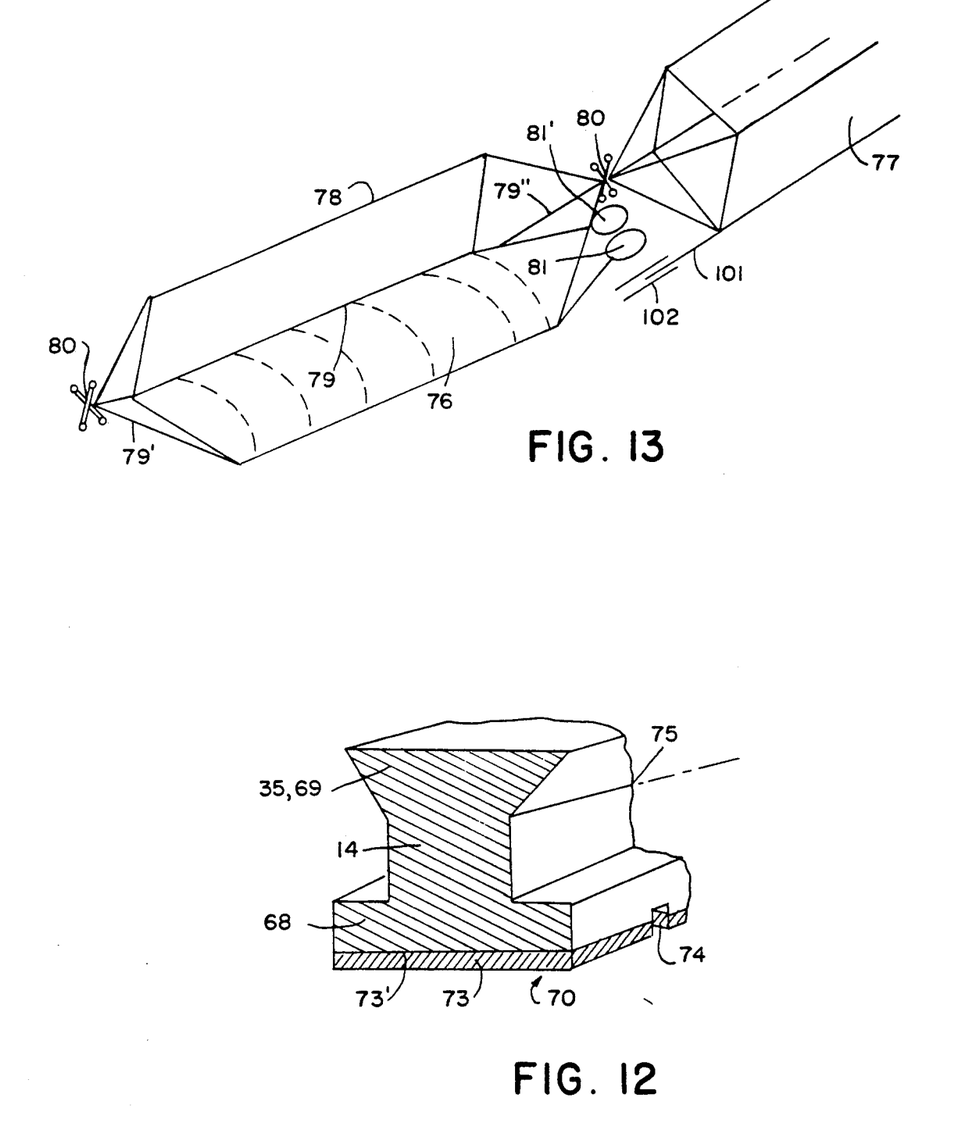
FIG. 12 shows a profile through the guide bar with reinforcing plate.
FIG. 13 shows a schematic drawing pertaining to the use of cardan joints.

FIG. 11 shows a simplified illustration of an overbelt (22). Belt (9), as indicated, is supported by lateral rollers (17) and also by additional rollers (17). In the middle, we have the bar (14) which is vulcanized upon belt (9) with its foot (35) or its overflange (69). This foot (35) is made correspondingly wide. In the version seen in FIG. 11, the lower flange (68) is provided with stiffening member (70). These stiffening members can have the shape of a bolt (71) that runs laterally with respect to the longitudinal direction of the guide bar (14) or they can come in the form of plates, as shown in FIG. 12. The bolts are pushed into lateral bore holes (72) while plate (73) can be glued, for example, on roughened surface (73'). Notchings (74) are provided to give belt (9) the necessary stability. In this way one can in particular ensure the turn-around of the reversing rollers (57). The notchings (74) run laterally with respect to the longitudinal axis (75) of guide bar (14).

One can achieve a carrying frame that can easily be adapted to all conditions if the individual subunits (76, 77) of the carrying frame (10) are connected with each other via a cardan joint (80). For this purpose, as we can see in FIG. 13, the individual beams (78, 79) are brought together. They come together rather pointedly at the connection ends in order thus to hit the cardan joint (80). This cardan joint (80) can come in different forms; this results in advantageous flexibility and a favorable alignment or deflection of the individual subunits (76, 77).

It is furthermore proposed that guide rollers (81) at the end of each subunit (76, 77) be installed as closely as possible to an imaginary line that runs at a right angle to the longitudinal extent of the subunit through the cardan joint (80). In this way one can prevent, in the case of vertical angles of the conveyor belt (1), that uneven intervals of belt (9) with respect to the cardan joint (80) might cause imbalances in the torques and lead to a situation where conveyor belt (1) or carrying frame (10) would buckle.

At a freely selectable interval with respect to the rotation points of cardan joint (80), one can provide stop surfaces (101) which—under certain circumstances made adjustably and equipped with corresponding extensions (102)—would limit the angular motions, made possible by the cardan joints (80), between the individual subunits (76, 77) to a desired measure. Subunits (76, 77) contain all devices and auxiliary parts that are necessary to support belt (9) as well as to guide and drive it. It is also conceivable that the entire conveyor belt might be placed on running gears or might be hitched to running gears in order thus, for example, to make the conveyor belt moveable in an articulated fashion.

Figure 14:
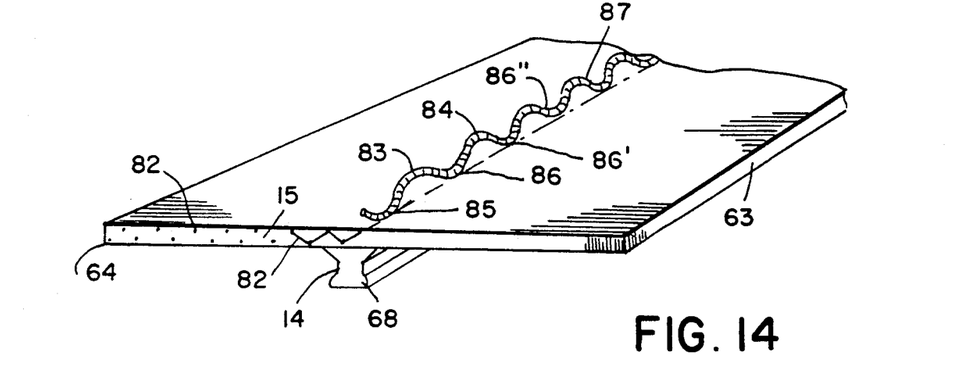
FIG. 14 shows a conveyor belt in the unloaded state.

FIG. 14 shows a version using rubber (15) allowing a stretch of at least 15 to 40%. For this purpose, we provided diagonally placed fabric inserts (82) in a supporting fashion, where the warp and the weft do not run longitudinally and laterally with respect to the guide bar (14) but diagonally with respect to it. One can also conceive of differently made textile inserts in the form of knit, woven, or fleece-processed yarns. A conveyor belt (1) made in this fashion as a rule forms one structural unit with guide bar (14). Both have a great degree of elasticity and the necessary traction forces are achieved by the fabric inserts but above all by a high-strength traction beam (83). This traction beam (83) is placed in the middle of the belt (9) and is connected with belt (9) at short intervals, with the formation of loops (84, 87) at a few fastening points (85, 86). This traction beam (83) can be attached to the highly-elastic cover of the conveyor belt (1) prior to the pre-stretching of belt (9), so that it is drawn out long, following along with the stretch action, and so that it can specifically absorb the necessary traction forces upon reaching the specified pre-stretch.

Figure 15:
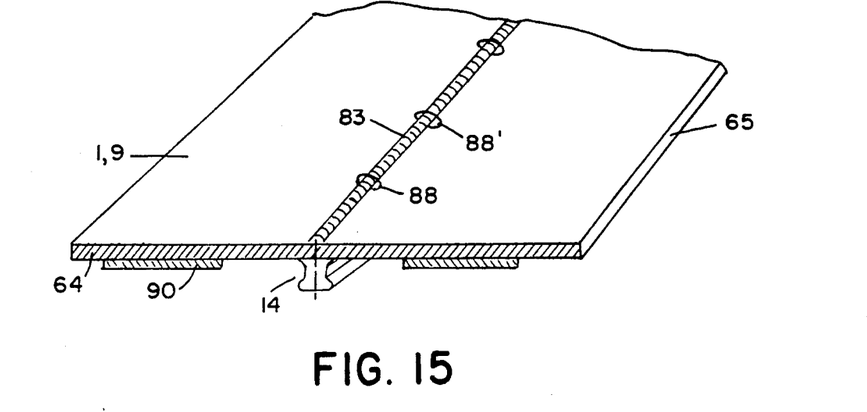
FIG. 15 shows a top view on a pre-stressed conveyor belt.

FIG. 15 then shows a version where the pre-stretch of belt (9) has resulted in traction beam (83) being laid taut. In the version shown here, traction beam (83) moreover is guided in rings (88) so that a connection with conveyor belt (1) is not necessarily required. This then also makes it possible to use a traction beam (83) in the form of a steel cable which otherwise could not at all be connected with belt (9) or which could be connected only with great difficulty.

When conveyor belt (1) is placed upon carrying frame (10), it must be elastically pre-stretched by the specified measure by means of suitable devices before it can then be combined into one endless belt. The fabric insert (82) or the reinforcement then creates the abutment for the connecting clamps that are to be inserted; according to FIG. 15, additional lateral stiffening members (90) can have an advantageous supplementary effect. These lateral stiffening members (90) are vulcanized on or vulcanized in so that one gets an advantageous lateral stiffness, without the longitudinal flexibility being thus hindered. Belt (9) is always taut and can fully accomplish its conveyor function by virtue of the pre-stretch.

Figure 16:
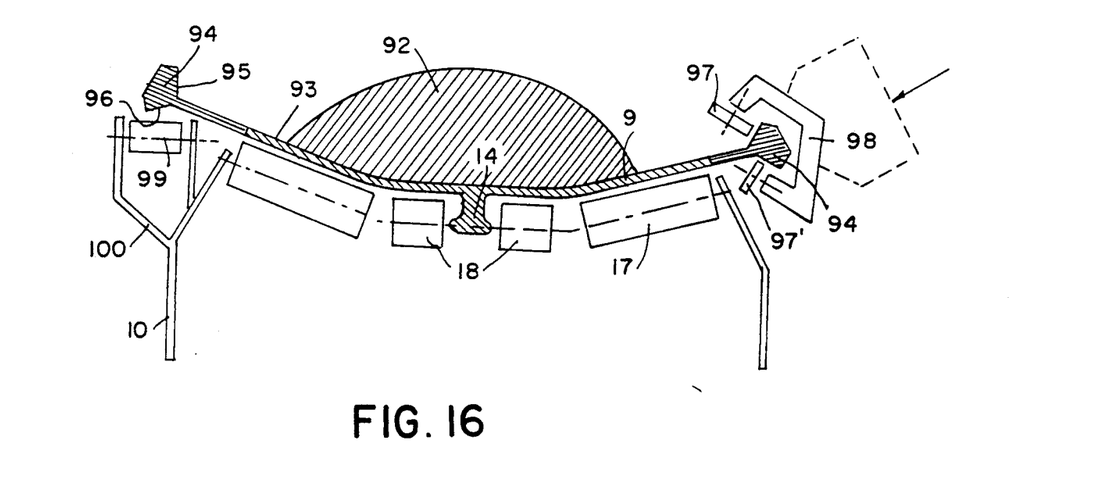
FIG. 16 shows a conveyor belt with edge guidance.

FIG. 16, in addition to the previously discussed features, reveals club-like extensions along the outer edges (93). In the middle, belt (9) has material to be conveyed (92), here, for example, coal. The club-like extensions (94) reveal supporting surfaces (95, 96) against which the catch rollers (97) of the catch arms (98) can be braced. Supporting surfaces (95, 96) run obliquely with respect to the top side or the under side of belt (9). Here we get an adequately stable supporting wall upon which the catch rollers (97) can roll off safely. The club-like extension (94) is always attached at the outside of the curve (4) in order thus to hold the belt in its correct position by means of the application of traction forces. In that way we can prevent folds or other changes that would impair the effectiveness of the belt.

If such club-like extensions (84) are provided on both sides, then it is a good idea to support the club-like extension (94) not in use, by means of a supporting roller (99) that is attached to the belt structure via a set of roller rods (100).

All of the features mentioned and explained in the specifications, including those seen only in the drawings, are considered alone and in combination to be essential to the invention.

We claim:

1. Conveyor belts, especially for use in below-ground mining and tunnel construction, having plural decentralized drive units distributed longitudinally in a carrying frame supporting plural drive rollers and plural roller blocks, a T-shaped guide bar provided on an underside of a drive belt, the drive rollers engaging each other by means of a clamping device such that the rollers wing towards each other thereby shifting the belt in a predetermined direction, a belt having plural belt inserts and being carried by the roller blocks, wherein the belt an the guide bar are of highly elastic rubber and are grasped by the mutually engaging drive rollers, and wherein the roller blocks have a middle with a recess, said recess corresponding to a recess on each of plural reversing rollers.

2. The conveyor belt of claim 1, wherein the clamping device engaging the drive rollers has a locking means for limiting a range of swing of the drive rollers.

3. The conveyor belt of claim 1, wherein the middle roller comprises two partial rollers arranged at an interval with respect to each other, said interval having a dimension corresponding to a dimension of a foot of the guide bar.

4. The conveyor belt of claim 1, further comprising plural guide units grasping the guide bar superposed on the guide units in an undertrack, the guide units also being arranged in an covertrack at an interval greater than that of the drive rollers.

5. The conveyor belt of claim 4, wherein the interval of the drive rollers and of the guide units increase, said increase corresponding to a curve radius of the belt.

6. The conveyor belt o claim 1, wherein a width of the guide bar increases with an increasing width of the belt.

7. The conveyor belt of claim 1, wherein the reversing rollers and the middle roller have plural independently functioning carrying disks positioned on a shaft, and having a recess in a central location adapted to receive the guide bar, further wherein the disks have a gradually increasing diameter, whereby the disks towards a center of the belt have lower diameters and the disks towards outer edges of the belt have increased diameters.

8. The conveyor belt of claim 7, wherein the carrying disks each have plural recesses and plural scoops within the recesses for effecting ventilation and cooling.

9. The conveyor belt of claim 1, further comprising plural friction wheels being arranged one after another in a direction of movement, the friction wheels together forming a drive roller unit, the drive roller unit being connected via a torque transmission system to a motor, and further wherein the drive roller unit is adjustably positioned such that the unit is movable in a direction of movement of the guide bar.

10. The conveyor belt of claim 1, wherein a lower flange of the guide bar has plural stiffening means formed as plural segments placed laterally with respect to a longitudinal axis of the guide bar.

11. The conveyor belt of claim 1, wherein plural subunits of a carrying frame have beams running together and being pointed at an end of each of the beams, whereby the beams are so arranged that the pointed ends form a cardan joint.

12. The conveyor belt of claim 1, wherein the belt inserts are stretchable fabric inserts, enabling stretching of 10% to 50%, and further comprising a high-strength traction beam running along a middle of the belt, the traction beam having a length of a belt when unstretched and being connected with the belt at plural points.

13. The conveyor belt of claim 1, wherein the belt comprises plural lateral stiffening members in the form of invulcanized inserts.

14. The conveyor belt of claim 1, wherein the belt comprises plural lateral stiffening members in the form of onvulcanized lateral ribs.

15. The conveyor belt of claim 1, wherein an outer edge of the belt on à outside of a curve has plural supporting surfaces formed as club-like extensions, and wherein the carrying frame has plural jibs along the curve, the jibs being arranged at an interval and being equipped with catch rollers for pressing against the corresponding supporting surfaces.

* * * * *